US012563125B2

(12) United States Patent
Trefcon et al.

(10) Patent No.: US 12,563,125 B2
(45) Date of Patent: Feb. 24, 2026

(54) ENTITY FOR IMPLEMENTING A SERVICE IN A NETWORK, APPLICATION DEVICE, AND METHOD FOR EXECUTING AN OPERATION OF A SERVICE

(71) Applicant: Orange, Issy-les-moulineaux (FR)

(72) Inventors: Michel Trefcon, Chatillon (FR); Alexandra Ansiaux, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 136 days.

(21) Appl. No.: 18/473,766

(22) Filed: Sep. 25, 2023

(65) Prior Publication Data

US 2024/0106907 A1 Mar. 28, 2024

(30) Foreign Application Priority Data

Sep. 26, 2022 (FR) ...................................... 2209720

(51) Int. Cl.
*H04L 67/51* (2022.01)
*H04L 67/568* (2022.01)
*H04L 67/60* (2022.01)

(52) U.S. Cl.
CPC ............ *H04L 67/51* (2022.05); *H04L 67/568* (2022.05); *H04L 67/60* (2022.05)

(58) Field of Classification Search
CPC ........ H04L 67/51; H04L 67/60; H04L 67/568
USPC ....................................................... 709/223
See application file for complete search history.

(56) References Cited

U.S. PATENT DOCUMENTS

| | | | | |
|---|---|---|---|---|
| 2015/0263977 | A1* | 9/2015 | Nair ........................ | H04L 47/70 |
| | | | | 709/226 |
| 2016/0127465 | A1 | 5/2016 | Barstow et al. | |
| 2018/0074917 | A1* | 3/2018 | Choudhary ......... | G06F 11/1446 |
| 2018/0338015 | A1* | 11/2018 | Wang ................. | H04L 67/5681 |
| 2023/0353996 | A1* | 11/2023 | Paczkowski ........... | H04L 41/16 |

FOREIGN PATENT DOCUMENTS

| | | | | |
|---|---|---|---|---|
| EP | 1906626 | A1 * | 4/2008 | ......... H04L 65/1104 |

OTHER PUBLICATIONS

French Search Report and Written Opinion dated Mar. 2, 2023 for Application No. FR2209720.

(Continued)

*Primary Examiner* — Zi Ye

(74) *Attorney, Agent, or Firm* — Knobbe, Martens, Olson & Bear, LLP

(57) ABSTRACT

An entity for implementing a service in a network, an application device, and a method for executing an operation of a service are described. An entity is configured to implement a first service implemented by a first application device of a communications network, the entity including a management module configured to acquire, via an application programming interface of a second service implemented in the network, data managed by the second service, said management module being configured to store said acquired data in a primary cache of the entity, an update module configured to update, following a modification of one of said data managed by said second service, the primary cache to reflect said modification using said programming interface, and a processing module, configured to use at least one of said data from the primary cache when executing at least one operation of the first service.

15 Claims, 2 Drawing Sheets

(56) References Cited

OTHER PUBLICATIONS

"3rd Generation Partnership Project; Technical Specification Group Services and System Aspects; Procedures for the 5G System (5GS); Stage 2, (Release 17)", 3GPP TS 23.502 V17.5.0 (Jun. 2022).

"3rd Generation Partnership Project; Technical Specification Group Core Network and Terminals; 5G System; Network Function Repository Services; Stage 3, (Release 17)", 3GPP TS 29.510 V17.6.0 (Jun. 2022).

"3rd Generation Partnership Project; Technical Specification Group Core Network and Terminals; 5G System; Unstructured Data Storage Services Stage 3; (Release 17)", 3GPP TS 29.598 V17.6.0 (Jun. 2022).

* cited by examiner

[Fig 1]
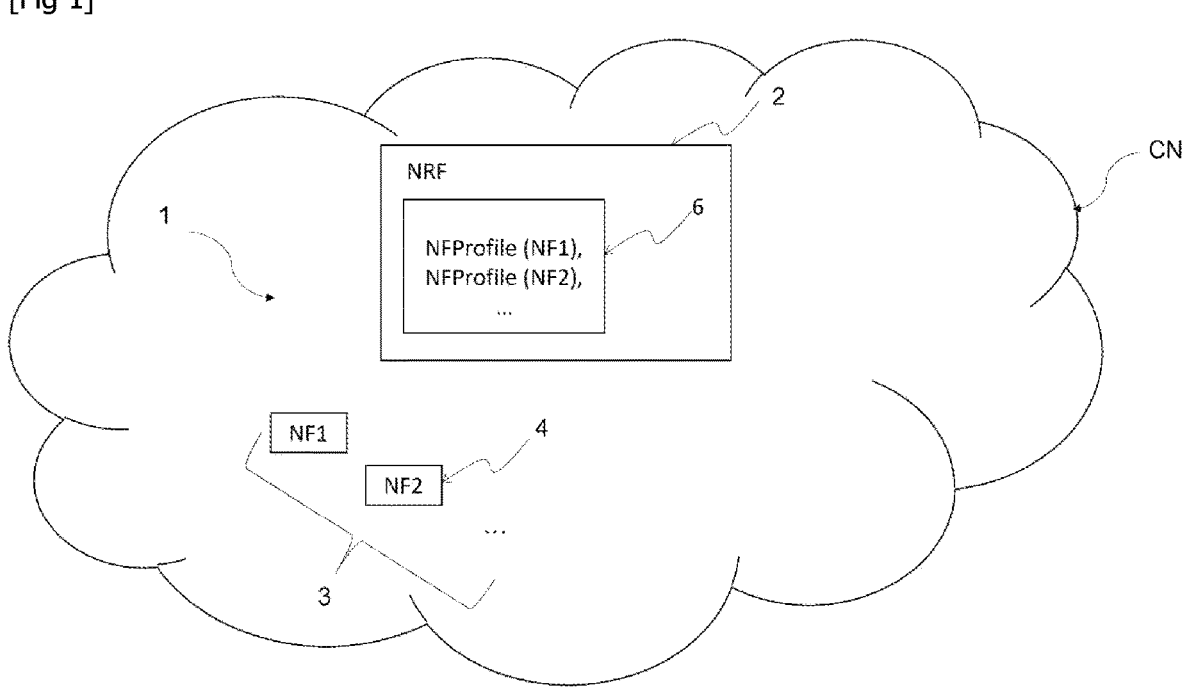
[Fig 2]
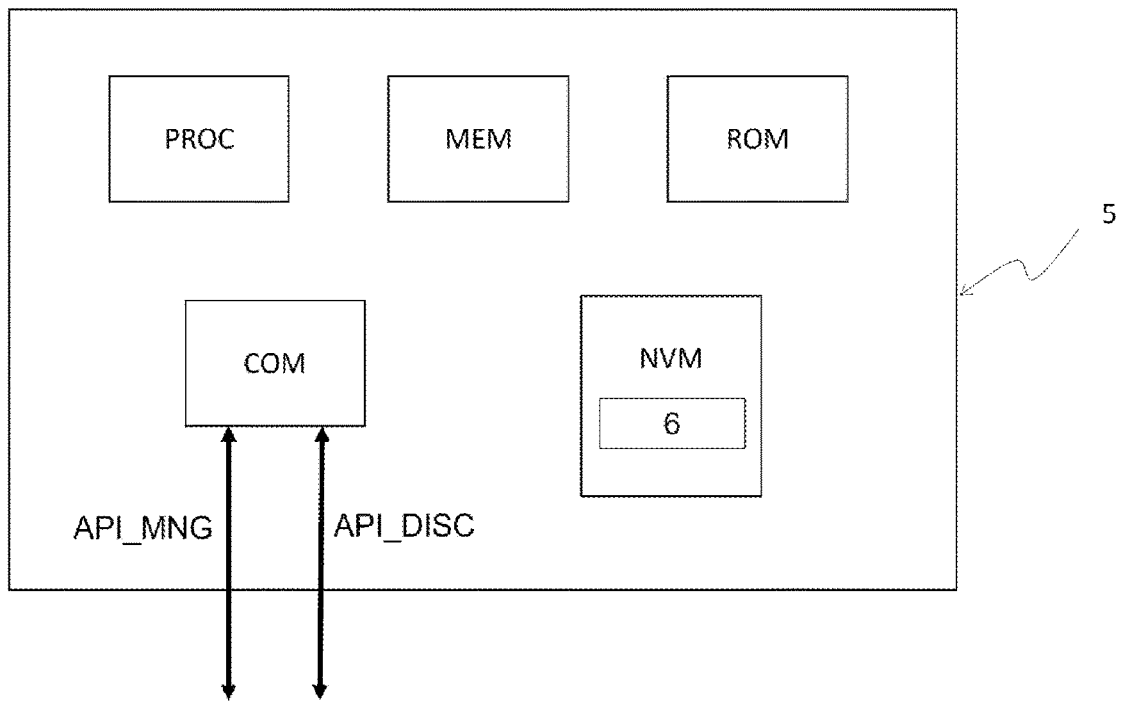

[Fig 3]
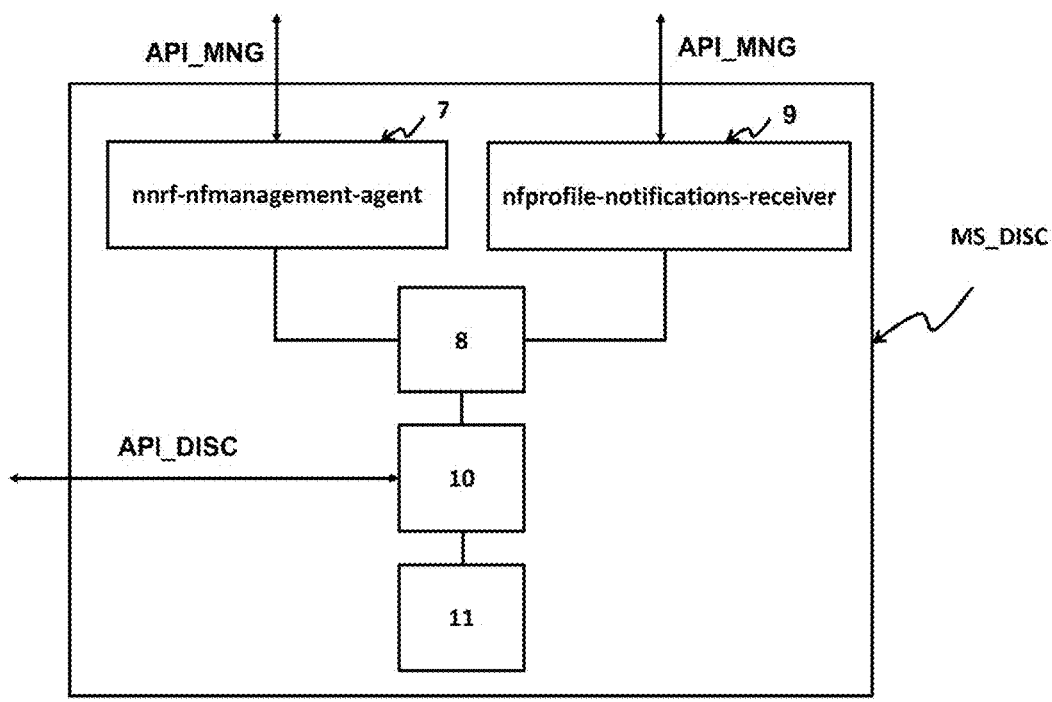
[Fig 4]
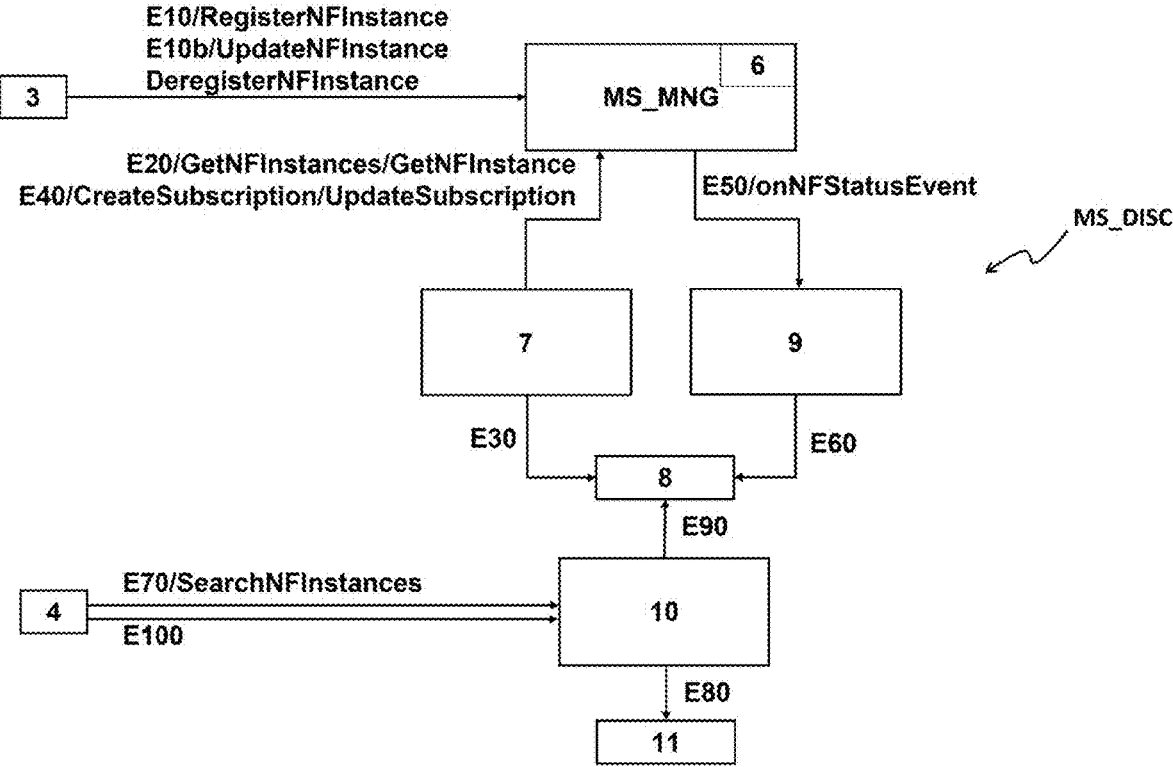

ENTITY FOR IMPLEMENTING A SERVICE IN A NETWORK, APPLICATION DEVICE, AND METHOD FOR EXECUTING AN OPERATION OF A SERVICE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims priority to French Patent Application No. 2209720, filed Sep. 26, 2022, which is hereby incorporated by reference in its entirety.

BACKGROUND

Technical Field

The present application relates to the general field of telecommunications. More specifically, it relates to an architecture for optimizing the operation and the performance capabilities of a service which, when called upon, relies on data managed by another service.

Description of Related Technology

The disclosed technology has a preferred but non-limiting application within the context of a 5G (or 5th Generation) core network as defined by the 3GPP (or "Third Generation Partner-ship Project") standard. Such a 5G core network is made up of, in a manner per se known, multiple Network Functions (NF), with each NF having its own role and logic. Examples of such NF functions are, for example, an Access and Mobility Management Function (AMF), a Session Management Function (SMF), a Network Slice Selection Function (NSSF), a Policy Control Function (PCF), etc. These network functions are managed in the 5G core network by another network function, called Network Function Repository Function (NRF). This NRF function is responsible for providing a client or services "consumer" network function with information allowing it to interact, directly or indirectly via an intermediary device (or SCP "Service Communication Proxy"), with a services "producer" network function.

Each NF function of the 5G core network conventionally provides a plurality of services to other core network functions authorized to access them, with each service itself having its own role and logic, and possibly comprising one or more resources (for example, REST "REpresentational State Transfer" resources). Thus, for example, the NRF network function is made up of four services, as notably described in the 3GPP documents TS 23.502 entitled, "Technical Specification Group Services and System Aspects; Procedures for the 5G System (5GS); Stage 2; (Release 17)", V17.5.0, June 2022, and TS 29.510 entitled, "Technical Specification Group Core Network and Terminals; 5G System; Network Function Repository Services; Stage 3 (Release 17)", V17.6.0, June 2022, namely:

an Nnrf_NFManagement management service: this service allows a "producer" NF function (or an instance of such a network function) to register, update and deregister its profile with the NRF function. The profile (or "NFProfile") of an NF function comprises a plurality of attributes characterizing the operational state of the NF function (for example, its availability, its load, how long it has been running, etc.), its features (for example, its identifier, its Fully Qualified Domain Name or FQDN, the type of NF function, how it can be joined, etc.), the services it offers, the resources it manages, etc. Attributes can be defined more specifically on each service implemented by the NF function (otherwise those defined on the NF function apply);

an Nnrf_NFDiscovery service: this service allows a "consumer" NF function to acquire a list of profiles of "producer" NF functions according to multiple search criteria, which notably can be linked to the logic of the "consumer" NF function and to an ongoing execution context;

an Nnrf_AccessToken authorization service based on the OAuth2 authorization delegation protocol;

an Nnrf_Bootstrapping initiation service that allows an NF function to know the access points to the services offered by the NRF function.

Thus, any "consumer" NF function wishing to consume the service of a "producer" NF function must first poll the Nnrf_NFDiscovery service of the NRF function (by invoking the SearchNFInstances operation) as a function of its business logic and its execution context, in order to acquire a list of profiles of candidate NF functions, managed by the Nnrf_NFManagement management service, corresponding to this execution context. Then, based on the acquired list of candidate NF functions, the "consumer" NF function identifies the candidate NF function best able to provide it with the desired service and sends an HTTP (HyperText Transfer Protocol) request to the appropriate service of the latter.

The specifications of the 5G core network make it particularly well suited to "cloud" computing environments. In such an environment, the NF functions of the 5G core network can be designed according to a micro-service software architecture (also sometimes referred to hereafter as "micro-service architecture" for the sake of simplification).

Indeed, as is per se known, such an architecture is commonly used in the field of software application development. It involves breaking down an application to isolate the main functions that can be executed independently of each other. These main functions, known as "services" or "micro-services", then advantageously can be developed and deployed separately, although they work in synergy. They can be hosted by the same application device or by separate application devices. The responsibility and the number of micro-services depend on the choices made by the application designer. In the aforementioned example of the NRF function, a micro-service can be contemplated for each Nnrf_NFManagement, Nnrf_NFDiscovery, Nnrf_AccessToken and Nnrf_Bootstrapping service implemented by the NRF function.

The advantage of a micro-service architecture compared with a conventional monolithic architecture, in which all the components form an indissociable entity, is that each micro-service can function (or malfunction) without affecting the others, which makes it easier for the application development and maintenance/update teams to structure and intervene.

Thus, the micro-service architectures, due to the flexibility of each micro-service, preferably (but in a non-limiting manner) integrate into "cloud" environments, which are known for their agility and offer scalable shared resources. Micro-services are coordinated and monitored in real time by an orchestrator, which notably monitors the load of each instance of the micro-service (commonly referred to as "pod"). When the load of the pods relating to a micro-service exceeds a given threshold, the orchestrator instantiates a new pod in order to respond to the increase in load. Conversely, the orchestrator deletes a pod when it considers that the current load distributed across all the pods falls below a certain threshold. This allows the consumption of resources (for example, CPU (Central Processing Unit), memory, energy, etc.) to be reduced. This dynamic mechanism for creating and deleting pods is also known as scalability or horizontal elasticity.

Although designed to be able to run independently of each other, micro-services may, in accordance with the processing logic that they implement, need to access data that is managed dynamically by other micro-services and that is likely to change over time. Typically, in the aforementioned example of the NRF function, in which the Nnrf_NFManagement and Nnrf_NFDiscovery services are implemented by two separate micro-services, the Nnrf_NFDiscovery micro-service needs, in order to respond to a "consumer" NF function, to access the list of profiles of "producer" NF functions registered with the Nnrf_NFManagement micro-service, these profiles can be updated over time (for example, creation of a profile, modification of attributes of a profile, changing the NF function from a registered state to a suspended state, or deletion of a profile). Within the context of a 5G core network, it is important to optimize this access in terms of design and operation, notably with a view to reducing the processing times implemented by each micro-service, which represent a key factor for the network operator due to their direct impact on resource consumption and, incidentally, on the operating cost of the underlying infrastructure deployed by the operator.

SUMMARY

The disclosed technology notably addresses this requirement by proposing an entity configured to implement a first service implemented by a first application device of a communications network, said entity comprising:

a management module configured to acquire, via an application programming interface of a second service implemented in the network, data managed by the second service, said management module being configured to store said acquired data in a cache, called primary cache, of the entity;

an update module configured to update, following a modification of one of said data managed by the second service, the primary cache to reflect this modification using said programming interface; and a processing module, configured to use at least one of said stored data from the primary cache when executing at least one operation of the first service.

Correspondingly, a further aim of the disclosed technology is a method for executing at least one operation of a service by an entity of a first application device of a communications network, said method comprising:

a step of acquiring, via an application programming interface of a second service implemented in the network, data managed by said second service;

a step of storing said acquired data in a cache, called primary cache, of said entity;

following a modification of at least one of said data managed by said second service, a step of updating the primary cache reflecting said modification using said programming interface; and a step of executing at least one operation of the first service using at least one of said data of the primary cache.

An application device is understood herein to mean any type of communicating device, hardware or virtual (i.e., software), configured to implement a determined processing logic, such as, for example, a device offering and/or consuming services in a network such as a network function or an instance of a network function of a core network. Thus, the first application device within the meaning of the disclosed technology notably can be an NRF network function (or a hardware device hosting such a network function) of a core network more specifically implementing Nnrf_NFManagement (second service within the meaning of the disclosed technology) and Nnrf_NFDiscovery (first service within the meaning of the disclosed technology) services as defined by the 3GPP standard, with said services being accessible via application programming interfaces (APIs). However, it should be noted that the disclosed technology is not limited to first and second services implemented by the same application device and/or by the same hardware equipment.

"Data managed by the second service" is understood to mean data administered by the second service, i.e., that the second service is able to acquire and optionally modify, and store, typically in an organized, reliable and persistent memory structure (in other words, over the long term, for a period that may not be limited), and manipulate (for example, rapidly and selectively). Such a memory structure is, for example, a database stored in a persistence layer.

In a particular embodiment, the relevant data relates to at least one second application device of the network.

Said at least one second application device refers, for example, to at least one "producer" NF function (or a hardware device hosting such a network function) of the core network. Thus, by way of an illustration, when the second service is the Nnrf_NFManagement management service of an NRF function as defined by the 3GPP standard, the data managed by this service comprises profiles of NF functions of the network, managed and kept up-to-date by the NRF function, for example, in a persistence layer, which the NRF function has acquired by means of a registration procedure executed by the NF functions.

Thus, the disclosed technology advantageously proposes an architecture according to which each entity implementing a distinct service of an application device (first application device within the meaning of the disclosed technology) relies on a memory structure that is specific thereto. For example, for the second service that manages the relevant data, such a memory structure is a persistence layer specific to the second service, accessible by other services (and more specifically by the first service) solely via the second service by means of a programming interface of the second service; the memory structure of the first service, which needs to access these data without being responsible for managing them, for its part is a local cache, called primary cache, (also known as "backend") of the entity implementing the first service. Replicating the data managed by the second service (or at least that part of it that is likely to be used by the first service) in a local cache of this entity, i.e., as close as possible to the first service, allows rapid access to be provided by the first service (and notably by its processing module) to the data it requires, if applicable, to execute the operations of the first service. This rapid access guarantees rapid execution of the first service by the first application device, and allows network latency to be improved.

In addition, the updates carried out by the update module of the entity implementing the first service advantageously allow synchronization to be guaranteed between the data managed by the second service and the replicas of this data stored in the primary cache, which ensures reliable execution of the first service by the first application device.

Furthermore, the fact that the processing module uses the data stored in its primary cache to execute the operations entrusted thereto not only saves time, but also allows the processing module to remain operational even when the second service fails (for example, due to the temporary unavailability of its persistence layer), provided that this failure is for a short period. Indeed, a short-term failure generally results in a short time lag between the data managed by the second service and the data stored in the primary cache and used by the first service. Thus, by virtue of the disclosed technology, a deterioration in the quality of the first service is avoided notwithstanding the failure of the second service.

In addition, as soon as the second service ceases to be faulty, provided that the persistence of the memory layer of the second service has not been modified, the update module of the entity implementing the first service is able to automatically resynchronize the data stored in the primary cache with the data managed by the second service. The disclosed technology therefore improves the stability of the network.

It should be noted that this advantageous behavior would not be possible if, alternatively, instead of implementing two distinct memory layers as in the disclosed technology, sharing the same persistence layer (for example, the same database) between the first and second services was contemplated, or if the processing module was configured to poll, each time an operation entrusted to it is executed, the persistence layer of the second service to acquire the data it requires rather than consulting the primary cache of the entity implementing the first service.

The use of a distinct memory structure for each of the services implemented by the first device also allows distinct persistence and access logics to be contemplated for these memory structures, individually responding to the needs and constraints of each of the services to which they belong. Typically, in the example of the NRF function contemplated above, the persistence logics for the NF function profiles stored by the Nnrf_NFManagement and Nnrf_NFDiscovery services and the access logics for accessing these profiles can be designed differently, notably if based on the APIs defined by the 3GPP standard, according to which the NF function profiles managed by the Nnrf_NFManagement management service can be accessed via the GetNFInstances operation by specifying two input parameters (NF function profile identifier (nfInstanceID) and NF function type (nfType)), whereas requests made to the Nnrf_NFDiscovery service using the SearchNFInstances operation can include a much higher number of input parameters (up to several dozen), notably in order to minimize the processing times for each service. Similarly, the memory structure of the Nnrf_NFManagement management service, in which the NF function profiles managed by this service are stored, is naturally persistent; the cache of the Nnrf_NFDiscovery service, on the other hand, may not be persistent but is very fast to execute.

Therefore, embodiments of the disclosed technology are characterized by a lack of adherence and low coupling between the first and second services implemented in the network. The lack of adhesion and the low coupling, combined with the use of an API, allow the two services to interact with each other to implement the functionalities for which the first application device is responsible in the network, even when separate parties have developed the two relevant services (whether or not they are both implemented by the first application device), or when the persistence layer of the second service changes. This offers significant flexibility in terms of the use of the disclosed technology.

In addition, the disclosed technology advantageously allows previously existing APIs to be used, for example, standardized APIs allowing interaction with the second service. Typically, within the context of the aforementioned NRF function, the disclosed technology allows the primary cache to be supplied and kept up-to-date with respect to the profiles of NF functions maintained by the Nnrf_NFManagement management service using the API of the Nnrf_NFManagement management service defined by the 3GPP standard.

The architecture model proposed by the disclosed technology consequently appears to be relatively in line with the independence logic of micro-services. It avoids the use of a persistence layer shared by the two services, which is inconsistent with this independence logic. For this reason, the disclosed technology has a preferred but non-limiting application within a context where the services of a communications network (and in particular the first and second services) are designed in the form of distinct micro-services.

As mentioned above, such a micro-service architecture is particularly well suited for implementing the network functions (NF) of a core network and notably the NF functions of a 5G core network as defined by the 3GPP standard. It should be noted that an increasingly disaggregated design of the NF functions of the core network is currently contemplated, typically by service operation, leading to multiple micro-services that are likely to want to access the same data concomitantly. Within this context, the use of a shared persistence layer (for example, a shared database stored in a persistence layer) creates problems in terms of competition and conflicts for accessing the persistence layer, which can prove to be very limiting, with these problems occurring very frequently, and resulting in significant complexity for the shared persistence layer. On the contrary, the disclosed technology is particularly well suited to such a development.

As mentioned above, the data managed by the second service notably can be data relating to at least one second application device on the network. In a particular embodiment, at least one of said operations executed by the processing module of the entity according to the disclosed technology comprises receiving a request from a third application device of the network relating to at least one of said second application devices and, in response to said request, providing data relating to said at least one second application device that is retrieved from the primary cache.

Thus, the disclosed technology is preferably applicable, but in a non-limiting manner, within the context of the Nnrf_NFDiscovery service executed by the NRF function of a 5G core network. However, the disclosed technology can be applied to other services, whenever concurrent access to data by several services needs to be managed.

For example, still within the context of a 5G core network, it is possible to contemplate applying the disclosed technology to the UDSF (Unstructured Data Storage Function) (first application device within the meaning of the disclosed technology), notably described in the 3GPP document TS 29.598 entitled, "Technical Specification Group Core Network and Terminals; 5G System; Unstructured Data Storage Services; Stage 3 (Release 17)", V17.6.0, June 2022. This UDSF function of the core network stores data called "un-structured" data (for example, context data of an ongoing session or of a user equipment). This data can be filed and modified with the UDSF function via an API by any type of NF function. To this end, for a resource of the "Record" type, for example, identified by its URI (Uniform Resource Identifier), an NF function can use the CreateorModifyRe-cord operations for creating and updating a resource and the DeleteRecord operations for deleting a resource provided by the Nudsf_DataRepository service of the UDSF function. It is also possible for an NF function to access a set of "Record" type resources stored by the UDSF function using the SearchRecord operation of the Nudsf_DataRepository service.

The 3GPP standard currently defines a single Nudsf_Da-taRepository service providing the CreateorModifyRecord, Delete and SearchRecord operations. However, in a similar manner to what is contemplated for the NRF function, it is possible to contemplate that the CreateorModifyRecord and Delete operations, on the one hand, and the SearchRecord operation, on the other hand, could be provided by separate services, with each service being able to be implemented by means of a micro-service. The disclosed technology then advantageously allows, for such an implementation, man-agement of concurrent access by the SearchRecord opera-tion (first service within the meaning of the disclosed technology) to the data created and/or modified by the CreateorModifyRecord and DeleteRecord operations (asso-ciated with a second service within the meaning of the disclosed technology).

Within another context, it is possible to contemplate applying the disclosed technology to data relating to tax-payers, managed by an IT management service (second service within the meaning of the disclosed technology) of the Ministry of Finance responsible for creating, modifying and updating these data, and to a service (first service within the meaning of the disclosed technology) required to select sets of these taxpayers on the basis of particular criteria for various reasons (for example, preparation of statistics, mac-roscopic tax forecast computation, etc.).

In a particular embodiment, the processing module of the entity according to the disclosed technology is configured to store said data supplied in response to the request from the third application device in a cache, called secondary cache (also called "frontend cache"), of the entity and to provide, in response to a similar or identical subsequent request, all or some of said data stored in the secondary cache.

This embodiment allows the processing time of the request from the third application device to be accelerated, since it allows a response previously made to a similar request to be re-used as it stands, without needing to poll the primary cache and to prepare such a response from the data acquired from the primary cache.

It should be noted that it is possible to associate a lifetime with each response stored in the secondary cache in order to avoid sending an obsolete response back to the third appli-cation device.

In addition, in order to further improve the performance capabilities of the entity implementing the first service, and notably its speed of executing the first service, the process-ing module can be configured to check, for each new request received from one of said third application devices, whether a previous similar or identical request has already been processed and, if applicable, can be configured to use the response contained in the secondary cache for this previous request, provided that this response is still valid.

In a particular embodiment, the entity according to the disclosed technology is configured to provide, with said data relating to said at least one second application device, a priority level assigned to said at least one second application device and/or a validity period of said data determined as a function of an update frequency of the data relating to said at least one second application device determined by the update module.

Indeed, the update module of the entity advantageously has access to the frequency of updating the data relating to the second application devices. It is possible to contemplate using this information to determine, for each second appli-cation device, a validity period for the data linked thereto, and incidentally, when this data is supplied to a third device in response to a request from said device, a validity period for this response. It should be noted that the 3GPP standard defines a validity period parameter (called validityPeriod) for the Nnrf_NFDiscovery service response, which applies to the entire response, in other words, to all the NF function profiles contained in the response. Such information is also present in the Cache-Control header of the response (stan-dard http header, per se known). In this embodiment, the disclosed technology allows the granularity of the validity-Period parameter and of the information contained in the response header to be improved by assigning a distinct validity period to each NF function profile (or, more gen-erally, to the data relating to each second application device known to the first service). Typically, the greater the fre-quency with which data relating to a second application device is updated, the shorter the validity period of this data.

The update frequency also can be used by the first service to assign a priority level to each of the second application devices. Notably, as mentioned above, when the frequency of updating data relating to a second application device is high, the validity period of this data is low. Thus, for two application devices implementing the same functions (for example, the same network function), it may be appropriate to assign a higher level of priority to the device whose data has a longer validity period. Of course, factors other than the frequency of updating data can be taken into account to determine such a priority level, notably such as the change of state of the considered application device (for example, transition from a registered state to a suspended state).

In a particular embodiment, the management module is configured to subscribe with the second service, via said programming interface, to a notification of the update mod-ule of modifications affecting said data managed by the second service relating to at least one of said second application devices.

When said subscription with the second service is under-taken for a limited period, the management module also can be configured to extend said limited period in order to keep said subscription active.

The disclosed technology thus allows the update module to be notified automatically and without delay in the event of modification of the data managed by the second service, and thus ensures perfect synchronization of the data stored in the primary cache with the data available to the second service. This also avoids the need for the first service to send regular requests to the second service for the purposes of such synchronization.

In a particular embodiment, said at least one second application device hosts a network function and said data managed by the second service relating to one of said second application devices comprises attributes of a profile of this second application device.

As mentioned above, the disclosed technology effectively has a preferred but non-limiting application when the first application device implements the first and the second service and is an NRF function of a core network as defined by the 3GPP standard.

In this particular embodiment, the update module also can be configured to update, following the reception of a notification from the second service comprising at least one attribute of a profile of one of said second application devices that has been modified, the primary cache with said at least one modified attribute of the profile contained in the notification.

Alternatively, the update module can be configured to apply, following the reception of a notification from the second service comprising at least one transformation operation reflecting a modification of at least one attribute of a profile of one of said second application devices managed by the second service, said at least one transformation operation to said at least one corresponding attribute stored in the primary cache in order to update said attribute.

Furthermore, in this particular embodiment, the management module also can be configured, via said programming interface, to:

poll the second service to acquire a list of identifiers of profiles managed by the second service;

send a request for each identifier in said list to acquire the corresponding profile managed by the second service; and store the acquired profiles in the primary cache.

The disclosed technology thus can be easily implemented by using standardized APIs, such as those defined by the 3GPP standard, notably for the NRF function. This simplifies the implementation of the disclosed technology and avoids defining new interfaces between the first and the second service.

In a particular embodiment, the management module is configured to trigger a verification of a match between the data managed by the second service and the data present in the primary cache at a given instant.

This verification provides an additional guarantee that the content of the primary cache is definitely synchronized with the content of the persistence layer of the second device. It can be executed on an ad hoc basis by the management module itself or by an external audit module appointed by the management module, using data structure synchronization mechanisms (such as databases) known to a person skilled in the art.

In a particular embodiment, the execution method is implemented by a computer.

The disclosed technology also relates to a computer program on a recording medium, with this program being able to be implemented in a computer or more generally in an entity according to the disclosed technology and comprising instructions adapted to implementing an execution method as described above.

The aforementioned program can use any programming language, and can be in the form of source code, object code, or of intermediate code between source code and object code, such as in a partially compiled format, or in any other desirable format.

A further aim of the disclosed technology is a computer-readable information medium or a computer-readable recording medium comprising the instructions of a computer program as mentioned above.

The information or recording medium can be any entity or device capable of storing the programs. For example, the medium can comprise a storage means, such as a ROM, for example, a CD-ROM or a microelectronic circuit ROM, or even a magnetic recording means, for example, a hard disk or a flash memory.

Moreover, the information or recording medium can be a transmissible medium such as an electrical or optical signal, which can be routed via an electrical or optical cable, via a radio link, via a wireless optical link or via other means.

The program according to the disclosed technology particularly can be downloaded over a network of the Internet type.

Alternatively, the information or recording medium can be an integrated circuit, in which the program is incorporated, with the circuit being adapted to execute or to be used to execute the execution method according to the disclosed technology.

According to another aspect, a further aim of the disclosed technology is an application device called first application device, of a communications network, comprising:

a first entity according to the disclosed technology, configured to implement a first service; and a second entity configured to implement the second service managing data relating to said at least one second application device of the network.

In a particular embodiment, said data managed by the second service is stored in a persistence layer of the second service accessible via said programming interface.

Furthermore, in a particular embodiment, the device according to the disclosed technology has a micro-services architecture, with the first entity and the second entity corresponding to distinct micro-services of said device.

The first application device according to the disclosed technology benefits from the same aforementioned advantages as the entity configured to implement a first service and the method for executing at least one operation of a service according to the disclosed technology.

According to yet another aspect, the disclosed technology relates to a system of a communications network comprising:

at least one first application device of the network according to the disclosed technology implementing a first service and a second service;

at least one second application device of the network configured to register data related thereto with the second service of the first application device; and at least one third application device of the network configured to send a request to the first service of the first application device relating to at least one of said second application devices.

In a particular embodiment, said at least one first, second and third application devices host network functions, with the network function hosted by the first application device managing profiles of said second application devices.

The system according to the disclosed technology benefits from the same aforementioned advantages as the entity configured to implement a first service, the first application device and the method for executing at least one operation of a service according to the disclosed technology.

BRIEF DESCRIPTION OF THE DRAWINGS

Further features and advantages of the present disclosed technology will become apparent from the following description, with reference to the accompanying drawings, which illustrate a non-limiting embodiment.

FIG. 1 shows a system, in its environment, in a network according to the disclosed technology, in a particular embodiment.

FIG. 2 schematically shows the hardware architecture of a computer that can host an application device according to the disclosed technology.

FIG. 3 shows the functional modules of an entity of the system of FIG. 1, according to the disclosed technology and configured to implement a first service.

FIG. 4 shows the relationships between the application devices of the system of FIG. 1 and the main steps of an execution method according to the disclosed technology, as implemented by the entity shown in FIG. 3, in a particular embodiment.

DETAILED DESCRIPTION

FIG. 1 shows a system 1, in its environment, of a communications network CN, according to the disclosed technology, in a particular embodiment.

In the embodiment described herein, the network CN is a 5G or 5GC core network, as defined by the 3GPP standard.

According to the disclosed technology, the system 1 comprises:

at least a first application device 2 of the core network CN, according to the disclosed technology, implementing a plurality of services. In the example contemplated herein, the first application device 2 hosts an NRF type network function, which, in accordance with the description in 3GPP documents TS 23.502 and TS 29.510, and as previously mentioned, implements four services, namely an Nnrf_NFManagement management service (second service within the meaning of the disclosed technology), an Nnrf_NFDiscovery service (first service within the meaning of the disclosed technology), an Nnrf_AccessToken authorization service, and an Nnrf_Bootstrapping initiation service;

at least one second application device of the core network CN (also referred to as a "producer" device), generally referred to in FIG. 1 with reference numeral 3, and configured to register data related thereto (and more specifically its NFProfile, as will be explained in greater detail hereafter) with the first application device 2. In the example contemplated in FIG. 1, said at least one second application device 3 comprises a plurality of devices hosting network functions (or NF functions), reference signs NF1, NF2, . . . , . The nature of these network functions NF1, NF2, . . . , is by no means limiting. They can be AMF, SMF, NSSF, PCF, etc., network functions; and at least one third application device 4 of the core network CN (also referred to as a "consumer" device), configured to send the first application device 2 a request relating to at least one of said second application devices 3 of the network. In the example contemplated herein, said at least one third application device 4 is typically one of the application devices 3, in other words, a device hosting a network function of the core network CN, wishing to consume the services of another network function of the core network CN hosted by one of the application devices 3. Thus, in the example contemplated herein, it is clearly understood that a device hosting a network function NF can be both a "producer" device registering with the device NRF 2, and a "consumer" device calling upon the device NRF 2 to acquire information concerning a "producer" device.

As mentioned above, the notion of "application device" herein equally refers to a hardware device and a software or virtual device. Thus, the disclosed technology equally applies to software or virtual application devices and to hardware application devices hosting network functions. When the considered application devices are hardware devices (for example, servers of an infrastructure of the core network CN), they have the hardware architecture of a computer 5, as illustrated in FIG. 2. This hardware architecture is based on a processor PROC, a random-access memory MEM, a read-only memory ROM, a non-volatile memory NVM, and communication means COM for communicating with other entities, for example, other entities of the core network CN. These communication means COM notably can be based on a wired or wireless communication interface, per se known and not described in greater detail herein, but also can be based on one or more software interfaces, and notably herein on an application programming interface (API) using the HTTP/2 protocol, as will be described in greater detail hereafter. When the application devices are software, they are themselves hosted by a hardware device having the hardware architecture of the computer 5, and can then rely on the aforementioned hardware means of the computer 5 (PROC, MEM, ROM, NVM, COM). Throughout the remainder of the description, for the sake of simplicity, reference is made to the PROC, MEM, ROM, NVM and COM means of the application device, whether this is hardware or software.

In accordance with the 3GPP standard, each application device 3 hosting a network function NF of the core network CN is configured to register its NFProfile with the device NRF 2. This profile comprises a plurality of attributes characterizing the operational state of the NF function (for example, its availability, its load, how long it has been running, etc.), its features (for example, its identifier, its Fully Qualified Domain Name or FQDN, the corresponding type of NF function, how it can be joined, etc.), the services it offers, the resources it manages, etc. The attributes can be defined on the NF function and/or on each service implemented thereby. This registration is carried out, as described in 3GPP documents TS 23.502 and TS 29.510, using an API of the Nnrf_NFManagement management service, referred to hereafter as API_MNG. The interface API_MNG in this case is the standardized "Nnrf_NFManagement API" described in appendix A.2 of 3GPP document TS 29.510. It is based on the HTTP/2 protocol and comprises a plurality of operations, including RegisterNFInstance, UpdateNFInstance and DeregisterNFInstance operations, which can be respectively used by the application devices 3 to register, update and deregister their profile with the Nnrf_NFManagement management service of the device NRF 2. The "Nnrf_NFManagement API" also includes a Heart-Beat operation, according to which each NF function registered with the device NRF 2 must contact the device NRF 2 periodically (according to a "Heart Beat" period) to indicate that it is still operational; when the device NRF 2 detects that an NF function has not updated its profile for a configurable time interval greater than the Heart-Beat period, it changes the status (i.e., the state) of the NF function in its profile from the "Registered" state to the "Suspended" state.

In the embodiment described herein, the profiles of the application devices 3 hosting the functions NF1, NF2, . . . , referenced NFProfile(NF1), NFProfile(NF2), . . . , are stored in a persistence layer 6 of the Nnrf_NFManagement management service of the device NRF 2, for example, in a database. Such a persistence layer 6 is located in a memory space of the non-volatile memory NVM of the device NRF 2, and is specific to the Nnrf_NFManagement management service. A "persistence layer" is understood to mean a reliable memory that persists beyond the end of the process that was the source of the data (in this example, the registration of the NF functions or the modification of their profiles). In the embodiment described herein, it is assumed that the persistence of the persistence layer 6 extends over a long, potentially unlimited period (i.e., the data stored in this persistence layer persists or survives over time potentially over an unlimited period).

The persistence layer 6 (and incidentally the database containing the profiles) is accessible for reading and writing by the Nnrf_NFManagement management service of the device NRF 2 only (in other words, it is not directly accessible by services other than the Nnrf_NFManagement management service). The Nnrf_NFDiscovery service of the device NRF 2 can access (read only) the content of the persistence layer 6 (and more specifically of the database containing the profiles) via the Nnrf_NFManagement management service with which it communicates via the interface API_MNG of the Nnrf_NFManagement management service. More specifically, the Nnrf_NFDiscovery service can access, via the interface API_MNG and the Nnrf_NF-Management management service, all or some of the attributes of the profiles stored in the persistence layer 6 using the GetNFInstances, GetNFInstance, CreateSubscription, UpdateSubscription, onNFStatusEvent operations, as discussed in more detail hereafter.

When an application device 4 hosting a "consumer" NF function wishes to access (i.e., consume) a service offered by an application device 3 hosting a "producer" NF function, in accordance with the 3GPP standard, the application device 4 calls upon the device NRF 2, and more specifically its discovery service Nnrf_NFDiscovery, by sending it a request to acquire a list of candidate application devices meeting one or more search criteria. To this end, the application device 4 uses an API, referred to herein as API_DISC, of the Nnrf_NFDiscovery service. This API is the standardized "Nnrf_NFDiscovery API" described in appendix A.3 of 3GPP document TS 29.510, which is based on the HTTP/2 protocol. It notably includes the SearchNFInstances operation, which allows the application device 4 to notify the Nnrf_NFDiscovery service of its search criteria (for example, type of NF function sought, geographical area, etc.). It should be noted that the SearchNFInstances operation (request within the meaning of the disclosed technology) includes two mandatory input parameters, namely the target-nf-type of the sought NF function ("producer" network function) and the requester-nf-type of the NF function that initiated the request (NF function implemented by the application device 4). Other optional input parameters can be added to specify more search criteria and thus allow the Nnrf_NFDiscovery service to refine the filtering of candidate "producer" NF functions to be supplied to the application device 4 in response to its request.

In the embodiment described herein, the various services implemented by the device NRF 2, and in particular the Nnrf_NFManagement and Nnrf_NFDiscovery services of the device NRF 2, are implemented in the form of micro-services. The micro-service implementing the Nnrf_NF-Management management service is referred to herein as MS_MNG, while the micro-service implementing the Nnrf_NFDiscovery service is referred to as MS_DISC. The micro-service MS_MNG, and a fortiori the medium on which this micro-service MS_MNG is stored (typically a memory space in the non-volatile memory NVM of the application device NRF 2), are each entities configured to implement the Nnrf_NFManagement management service of the device NRF 2. The micro-service MS_DISC, and a fortiori the medium on which this micro-service MS_DISC is recorded (typically a memory space of the non-volatile memory NVM of the application device NRF 2), are each entities configured to implement the Nnrf_NFDiscovery service of the device NRF 2, in accordance with the disclosed technology.

Throughout the remainder of the description, only the modules of the micro-service MS_DISC are described in detail; however, it is obvious to a person skilled in the art that the medium on which the micro-service MS_DISC is registered has the same modules, and therefore what characterizes the micro-service MS_DISC also characterizes the medium on which it is registered. Furthermore, as the Nnrf_NFManagement management service and the discovery Nnrf_NFDiscovery service are implemented in the form of the micro-services MS_MNG and MS_DISC, throughout the remainder of the description it is considered to be the same as referring to the Nnrf_NFManagement management service, respectively to the Nnrf_NFDiscovery service, and to the micro-service MS_MNG, respectively to the micro-service MS_DISC.

According to the disclosed technology, and as illustrated in FIG. 3, the micro-service MS_DISC comprises, in the form of computer program instructions executable by the processor PROC of the device NRF 2, the following software modules:

a management module 7 (also referred to herein as nnrf-nfmanagement-agent) configured to acquire, via the interface API_MNG of the micro-service MS_MNG of the device NRF 2, data managed by the micro-service MS_MNG, relating to at least one "producer" NF function NF1, NF2, ..., of the core network CN and contained in the persistence layer 6. The management module 7 is configured to store the acquired data in a cache 8, called primary cache (or "backend cache"), specific to the micro-service MS_DISC, and only accessible by said micro-service. The primary cache 8 in this case is a volatile cache, which is initially empty when the device NRF 2 is started up, and which is characterized by low latency and high throughput, in other words, by its speed of execution and access, notably relative to the persistence layer 6 of the micro-service MS_MNG. It should be noted that, in the embodiment described herein, when choosing the cache 8, preference is especially given to its access speed (i.e., its low or very low latency) and its high bandwidth (as opposed to the possible persistence, as for the persistence layer 6);

an update module 9 (also referred to herein as nfprofile-notifications-receiver) configured to update, following a modification of one of the data managed by the micro-service MS_MNG and contained in the persistence layer 6, the primary cache 8 to reflect this modification. The update module 9 uses the interface API_MNG to be notified of modifications to the data managed by the micro-service MS_MNG, as will be explained in further detail hereafter; and a processing module 10, configured to access the primary cache 8 as read-only and to use at least the data stored in the primary cache 8 when the micro-service MS_DISC is called upon to execute an operation of the Nnrf_NFDiscovery service. Thus, the relevant operation is executed without adherence to the persistence layer 6 of the micro-service MS_MNG. Such an operation involves, for example, receiving from an application device 4 implementing a "consumer" NF function of a SearchNFInstances discovery request, preparing a response to this discovery request by polling the primary cache 8 and providing the application device 4 that initiated the request with the response.

In the embodiment described herein, the data acquired from the micro-service MS_MNG and stored by the management module 7 are attributes of the NFProfile profiles of the "producer" NF functions NF1, NF2, . . . , managed by the micro-service MS_MNG of the device NRF 2. The management module 7 can be configured to acquire the whole of each NFProfile contained in the persistence layer 6 of the micro-service MS_MNG or only part of each profile (i.e., only certain attributes).

FIG. 4 notably illustrates the relationships between the various elements of the system 1. With reference to this figure, the operation of the micro-service MS_DISC modules and the steps of the execution method according to the disclosed technology as implemented by these modules will now be described. As mentioned above, in the embodiment described herein, the micro-service MS_DISC and the elements of the system 1 communicate using standardized API operations (API_MNG and API_DISC) described in appendices A.2 and A.3 of 3GPP document TS 29.510. A person skilled in the art is invited to refer to these appendices for a detailed description of these operations and of the relevant APIs.

As mentioned above, it is assumed herein that the application devices 3 hosting "producer" NF functions NF1, NF2, . . . , have registered their respective NFProfile profiles with the device NRF 2, via the interface API_MNG of the micro-service MS_MNG, and notably the RegisterNFInstance operation (step E10). These profiles are stored in the persistence layer 6 of the micro-service MS_MNG, in the aforementioned database. They can be updated by the application devices 3, in the event of the modification of one or more attributes using the UpdateNFInstance operation of the interface MS_MNG, or can be deleted, for example, if an NF function instance is shutdown, by means of the DeregisterNFInstance operation (step E10b). As mentioned above, the device NRF 2, and more specifically the micro-service MS_MNG, can also update a profile of an application device 3 in order to switch its state from "Registered" to "Suspended" in the event of inactivity of the NF function hosted by this application device 3.

When the device NRF 2 starts up, the volatile primary cache 8 of the micro-service MS_DISC is empty. The micro-service MS_DISC management module 7 is responsible for initializing the primary cache 8 and implementing the process for updating the primary cache 8 by the update module 9.

More specifically, the management module 7 in this case firstly copies all the NFProfile profiles of the NF functions NF1, NF2, . . . , contained in the persistence layer 6 of the micro-service MS_MNG (step E20). To this end, it uses the GetNFInstances and GetNFInstance operations of the interface API_MNG. The GetNFInstances operation allows the management module 7 to poll the micro-service MS_MNG to acquire the list of identifiers (URIs "Uniform Resource Identifier" in this case) of the NF function profiles contained in the persistence layer 6 of the micro-service MS_MNG. For each URI in the list of URIs acquired from the micro-service MS_MNG, the management module 7 sends a request to the micro-service MS_MNG, using the GetNFInstance operation in order to acquire the NFProfile of the associated NF function managed by the micro-service MS_MNG and stored in the persistence layer 6. This operation can be carried out at the same time for the various URIs in the list of acquired URIs for performance reasons.

The NF function profiles thus acquired by the management module 7 are then stored by said module in the primary cache 8 (step E30).

At the same time, the management module 7 subscribes with the micro-service MS_MNG to notify the update module 9 of any modification (creation of profiles, updating of attributes, suspension of NF functions or deletion of profiles) affecting the NF function profiles managed by the micro-service MS_MNG (step E40).

As an alternative embodiment, it can limit notification to certain specific events, for example, to modifications of only certain attributes of the profiles, typically when the management module 7 has replicated only part of the profiles in the primary cache 8, to the attributes that it has replicated or wishes to replicate.

When the subscription has a limited period, the management module 7 is configured to extend this validity period so as to keep the subscription active.

This subscription uses the CreateSubscription operation of the interface API_MNG. It can be updated at any time by the management module 7, using the UpdateSubscription operation of the interface API_MNG. More specifically, the management module 7 in this case undertakes a subscription per NF function type (subscrCond=NFTypeCond attribute), for each type of existing NF function (with the list of types of NF functions being known and finite). By way of an illustration, within the context of the 3GPP standard, such a list is notably provided in the TS 29.510 document cited above and includes NF functions defined by the 3GPP standard, as well as NF functions not defined by the 3GPP standard, called "custom NF type"). The management module 7 also indicates the URI of the update module 9, which is configured to process notifications, as the recipient of the notifications ("endpoint") in the nfStatusNotificationUri attribute of the CreateSubscription operation. In this way, the management module 7 ensures that it is notified when all the NF function profiles have been updated. It should be noted that this URI can be unique or can vary, for example, according to the type of NF function specified in the subscription (in other words, several instances of the update module 9 can be contemplated, with each having its own "endpoint" and being associated with one or more types of NF functions), for example, in order to distribute the load of processing notifications.

Thus, any modification affecting a profile managed by the micro-service MS_MNG corresponding to the subscription undertaken by the micro-service MS_DISC management module 7 is reported to the update module 9, via the interface API_MNG, and more specifically the onNFStatusEvent operation (step E50). Such a modification can involve creating a new profile, modifying one or more existing profiles stored in the persistence layer 6 of the micro-service MS_MNG, modifying the status of an NF function in an existing profile (transition from the "Registered" state to the "Suspended" state) or deleting an existing profile. It should be noted that the frequency with which the profile of an NF function is updated can be random or linked to automatic processes that follow a predictive and modelable logic.

When a notification relates to an update of an existing profile, it can assume several formats: according to a first format, the relevant profile is transmitted in its entirety to the update module 9 (or at least, all the attributes of the profile with which the management module 7 has subscribed); according to a second format, a series of transformation operations applied to the previous value of the profile and reflecting the modifications made thereto is transmitted in the notification.

Thus, upon receiving a notification according to the first format, the update module 9 updates the profile (or the portion of profile) stored in the primary cache 8 with the modified profile (or the portion of profile) contained in the notification; for example, it retrieves the profile (or the portion of profile) contained in the notification and copies it into the primary cache 8 to replace the one that is stored. According to an alternative embodiment, only the attributes that have been modified are retrieved from the notification and copied into the primary cache 8 to replace the stored values of the relevant profile.

Upon receiving a notification in the second format, the update module 9 reads the corresponding profile from the primary cache 8, applies the series of transformation operations transmitted in the notification to the attributes of the profile to reflect the modifications made to these attributes on the profile managed by the micro-service MS_MNG, and copies the modified profile thus acquired in place of the one stored in the primary cache 8.

It should be noted that in the embodiment described herein, if the notification relates to a profile that is not present in the primary cache 8, the management module 9 retrieves the complete profile (or the portion of the profile of interest) using the GetNFInstance operation of the interface API_MNG.

The selection of either one of the notification formats depends on the operating mode of the device NRF 2. This operating mode can result from a static configuration (by the network operator) or can vary over time and/or be selected by the device NRF 2 itself (for example, if a large number of transformation operations is considered, it can be worthwhile, for reasons of complexity and speed of execution, to transmit the complete profile rather than the transformation operations).

Once the primary cache 8 of the micro-service MS_DISC has been updated (step E60), the content of the primary cache 8 faithfully reflects the content of the persistence layer 6 of the micro-service MS_MNG, in other words, the primary cache 8 and the persistence layer 6 are synchronized. However, it is possible to contemplate that the management module 7 can occasionally trigger a verification of a match between the two contents. This verification can be executed directly by the management module 7 or can be entrusted to an external audit module, and can be based on synchronization mechanisms known to a person skilled in the art and not described in detail herein (for example, verification of the number of profiles, profile types, etc., via "checksum" or CRC (Cyclic Redundancy Check) type mechanisms).

The steps E10 to E60 described above allow the management module 7 to supply the primary cache 8 and keep its content up-to-date with the content of the persistence layer 6 of the micro-service MS_MNG. They ensure, in a very short space of time, that the primary cache 8 contains all the NF function profiles (or portions of profiles of interest to the micro-service MS_DISC) managed by the micro-service MS_MNG, so that the micro-service MS_DISC is fully operational to manage the operations it is responsible for executing and that the responses it provides are consistent with the NF function profiles managed by the micro-service MS_MNG. It should be noted that the time taken to initialize the primary cache 8 also depends on the ability of the micro-service MS_MNG to process bursts of GetNFInstance requests in a very short space of time.

The execution of an operation for which the micro-service MS_DISC is responsible will now be described, and more specifically the processing, by its processing module 10, of a discovery request received from an application device 4 hosting a "consumer" NF function (step E70). This discovery request is sent by the application device 4 to the micro-service MS_DISC processing module 10 via the interface API_DISC; it is based on the SearchNFInstances operation, configured with the search criteria requested by the application device 4. As indicated above, the SearchN-FInstances operation comprises two mandatory input parameters (type of "consumer" network function and type of "producer" network function sought), and can also comprise a plurality of optional input parameters representing additional search criteria specified by the application device 4.

In the embodiment described herein, following the reception of the SearchNFInstances discovery request, the micro-service MS_DISC processing module 10 consults a secondary cache 11 (or "frontend cache") of the micro-service MS_DISC (step E80). This secondary cache 11 is fed by the processing module 10 for each request addressed thereto, provided that it is a new request (i.e., new parameters), which does not correspond to a request already processed by the processing module 10 within a given period of time (corresponding to the validity period of the responses made by the processing module 10). The processing module 10 thus stores, in the secondary cache 11, each response sent to an application device 4 that formulated a discovery request therewith, in association with the input parameters for this request. Each entry in the secondary cache 11 has a lifetime equal to the validity period of the corresponding response. Thus, for each new received request, the processing module 10 in this case is configured to systematically consult its secondary cache 11 to identify whether a similar or identical request has already been processed and whether a valid response (i.e., one whose validity period has not expired) exists, if applicable. If applicable, it retrieves the response made to this request from the secondary cache 11, updates the HTTP headers of the response and the validity time of the response, and sends it to the application device 4 (step E100). The use of the secondary cache 11 allows the response time of the micro-service MS_DISC to be reduced, and in particular of its processing module 10, since the internal processing required to prepare a response to a request is not repeated for any identical or similar SearchN-FInstances operation received in a time interval corresponding to the validity period of the response.

If the discovery request corresponds to a request that has not already been processed by the processing module 10, or if it is not received within the time interval corresponding to the validity period of a response made to a similar or identical request, the processing module 10 polls the primary cache 8 in order to prepare a response to this request (step E90). More specifically, based on the input parameters of the SearchNFInstances request that it has received, it identifies, from among the profiles of the NF functions (or portions of profiles) stored in the primary cache 8, the "candidate" NF functions responding to these input parameters and thus to the search criteria formulated by the application device 4. It then returns the profiles (or portions of profiles acquired or attributes of the profiles required in the response) of the candidate NF functions retrieved from the primary cache 8, in a response to the SearchNFInstances request, via its interface API_DISC (step E100).

In each response made to the SearchNFInstances request (retrieved from the secondary cache 11 or new response prepared by polling the primary cache 8), the processing module 10 includes a validity period in the validityPeriod attribute of the response (as well as in the Cache-Control header of the response). This validity period can have a fixed value (for example, configured by the network operator, and selected so as to be identical for all responses or per type of NF function, etc.) or can be determined dynamically. If it is selected so as to be too short, the application device 4 that initiated the request may have to call upon the micro-service MS_DISC frequently, or even excessively, even though the NF function profiles that it has been supplied have not changed since its previous request. By contrast, if this value is set too high, some or all the NF function profiles in the secondary cache 11 will no longer be up-to-date, which could lead to malfunctions or an imbalance in the interworking of the NF functions within the core network CN (for example, overloading one NF function to the detriment of another (poor load balancing or control), requesting an NF function that is unavailable or suspended or is even deregistered, etc.). The validity period therefore must be selected in such a way as to take into account these aspects.

The validity period indicated in a response applies to all the NF function profiles provided in this response. In a particular embodiment, in order to set said period it is possible to contemplate taking into account the validity period of the NF function profile, which is bound to change in the shortest time interval from among all the NF function profiles provided in the response, but also, more generally, to contemplate taking into account the dynamicity of the 5G core network (registration of new NF functions, deregistration of NF functions).

By virtue of the disclosed technology, the discovery micro-service MS_DISC has access to the update frequency of each NF function profile via the notifications received by the update module 9 for each of them. Based on these update frequencies, it is possible for the processing module 10 to deduce a more or less predictive validity period for each NF function profile (corresponding to the update frequency of the profile) and to use this information to determine a validity period for a response provided to a request.

In an alternative embodiment, a validity period (or equivalently, end-of-validity information) can be added in the response for each NF function profile provided in the response, for example, in a vendor attribute.

It should be noted that due to the uncertainty and the significant variability of the update frequencies available to the micro-service MS_DISC, there is uncertainty concerning the validity periods determined on the basis of these update frequencies; in order to take into account this uncertainty, the micro-service MS_DISC of the device NRF 2 (for example, via its processing module 10) can, in a particular embodiment, assign a lower level of priority in the primary cache 8 (for example, in the "priority" attribute of the profile) to an NF function profile associated with a validity period exhibiting a high degree of uncertainty (i.e., low or corresponding to a high update frequency and for which it is not possible to determine whether its validity period is greater than the validity period of the response made to the request. Other factors can be taken into account for assigning a priority level to an NF function profile (or equivalently to a given NF function or NF function instance), such as, for example, the fact that its state switches from a registered state to a suspended state and that it remains in this state. The priority level allocated to a profile advantageously can be provided in the response sent to the application device 4 or can be used by the processing module 10 to determine the profiles to be inserted in this response (for example, it may not select the profiles associated with the lowest priority levels).

Thus, instead of repeatedly and systematically polling the persistence layer 6 of the micro-service MS_MNG for each discovery request received by the micro-service MS_DISC, the disclosed technology allows the micro-service MS_DISC to poll its primary cache 8 and/or its secondary cache 11 only once. In addition, selecting a primary cache 8 with low latency and high throughput allows the processing time of a discovery request to be reduced.

By way of an illustration, by considering one million SearchNFInstances operations sent by application devices of the core network CN to the micro-service DISC of the device NRF 2 via the interface API_DISC, and a saving of 1 ms per request using the primary cache 8, the result is a saving that is brought about by the disclosed technology of 16 mn and 40 s per million SearchNFInstances requests processed by adding a primary cache. Once this primary cache has been initialized, the micro-service MS_MNG is no longer called upon apart from sending notifications of updates of the NF function profiles to the update module 9 of the micro-service MS_DISC, which represents a negligible load for the micro-service MS_MNG compared with other operations carried out by the latter, such as, for example, the management of the NF function profiles. By contrast, in the absence of a primary cache, as mentioned above, the micro-service MS_MNG must be called upon at the same rate as the SearchNFInstances operations requested from the micro-service MS_DISC. This has consequences with respect to the consumption of resources of the micro-service MNG and can affect its performance capabilities for processing the NF function profile management operations.

The disclosed technology therefore allows the performance capabilities of each of the micro-services MS_MNG and MS_DISCs of the device NRF 2 to be optimized.

Furthermore, as highlighted above, the disclosed technology advantageously allows the micro-service MS_DISC to remain operational in the event of failure or unavailability of the micro-service MS_MNG, and notably of its persistence layer 6, due to the absence of adhesion between the micro-service MS_DISC and the persistence layer 6.

It should be noted that the disclosed technology has been presented within the context of a 5G core network, of application devices hosting NF functions, of a first and a second service implemented by the same NF function (by an NRF function more specifically) and of a micro-services architecture adopted for the device NRF managing the profiles of the NF functions. However, these assumptions are not limiting in themselves, and the disclosed technology can be applied in other contexts as mentioned above. Notably, it can be applied to any IT architecture where a service S manages data according to an organization optimized to meet various constraints that are specific thereto, and offers, via an API, operations allowing other services (whether or not they are implemented by the same application device that implements the service S) to replicate and keep up-to-date, in a non-intrusive manner, data managed by the service S for the purpose of organizing it according to their own constraints. By virtue of the disclosed technology, the service S is not called upon by the operations implemented by the other services, but only for initializing and updating the data of each of the other services. Thus, the load of a third-party service does not affect the load of the service S that is the source of the data.

What is claimed is:

1. An entity configured to implement a first service implemented by a first application device of a communications network, said entity comprising a processor and a memory, said entity further comprising:
    a management module configured to acquire, via an application programming interface of a second service implemented in the network, data managed by the second service, said data managed by the second service relating to at least one second application device of the network, wherein said at least one second application device hosts a network function and said data managed by the second service relating to one of said at least one second application device comprises attributes of a profile of this at least one second application device, said management module being configured to store said acquired data in a primary cache of the entity;

an update module configured to update, following a modification of one of said data managed by said second service and reception of a notification from the second service comprising at least one attribute of a profile of one of said at least one second application device that has been modified, the primary cache with said at least one modified attribute of the profile contained in the notification using said programming interface; and a processing module, configured to use at least one of said data from the primary cache when executing at least one operation of the first service.

2. The entity of claim 1, wherein said at least one operation comprises receiving a request from a third application device of the network relating to at least one of said at least one second application device and, in response to said request, providing data relating to said at least one second application device that is retrieved from the primary cache.

3. The entity of claim 2, wherein the processing module is configured to store said data supplied in response to the request from the third application device in a cache, called secondary cache, of the entity and to provide, in response to a similar or identical subsequent request, all or some of said data stored in the secondary cache.

4. The entity of claim 2, further configured to provide, with said data relating to said at least one second application device, a priority level assigned to said at least one second application device and/or a validity period of said data determined as a function of an update frequency of the data relating to said at least one second application device determined by the update module.

5. The entity of claim 1, wherein the management module is configured to subscribe with the second service, via said programming interface, to a notification of the update module of modifications affecting said data managed by the second service relating to said at least one of said second application device.

6. The entity of claim 5, wherein, when said subscription with the second service is undertaken for a limited period, the management module is configured to extend said limited period in order to keep said subscription active.

7. The entity of claim 1, wherein the update module is configured to apply, following the reception of a notification from the second service comprising at least one transformation operation reflecting a modification of at least one attribute of a profile of one of said at least one second application device managed by the second service, said at least one transformation operation to said at least one corresponding attribute stored in the primary cache in order to update said attribute.

8. The entity of claim 1, wherein the management module is configured, via said programming interface, to:

poll the second service to acquire a list of identifiers of profiles managed by the second service;

send a request for each identifier in said list to acquire the corresponding profile managed by the second service; and store the acquired profiles in the primary cache.

9. The entity of claim 1, wherein said management module is configured to trigger a verification of a match between the data managed by the second service and the data present in the primary cache at a given instant.

10. A first application device of a communications network, the first application device comprising:

the entity of claim 1 configured to implement the first service; and a second entity configured to implement the second service managing data relating to said at least one second application device of the network.

11. The first application device of claim 10, wherein said data managed by a second micro-service is stored in a persistence layer of the second service accessible via said programming interface.

12. The first application device of claim 10 having a micro-services architecture, with the entity and the second entity corresponding to distinct micro-services of said device.

13. A method for executing at least one operation of a service by an entity of a first application device of a communications network, said method comprising:

acquiring, via an application programming interface of a second service implemented in the network, data managed by said second service, said data managed by the second service relating to at least one second application device of the network, wherein said at least one second application device hosts a network function and said data managed by the second service relating to one of said at least one second application device comprises attributes of a profile of this at least one second application device;

storing said acquired data in a primary cache of said entity;

following a modification of at least one of said data managed by said second service and reception of a notification from the second service comprising at least one attribute of a profile of one of said at least one second application device that has been modified, updating the primary cache with said at least one modified attribute of the profile contained in the notification using said programming interface; and executing at least one operation of the first service using at least one of said data of the primary cache.

14. A system of a communications network, the system comprising:

the first application device of claim 10 implementing the first service and the second service;

said at least one second application device of the network, said at least one second application device configured to register data related thereto with the second service of the first application device; and at least one third application device of the network, said at least one third application device configured to send a request to the first service of the first application device relating to at least one of said at least one second application device.

15. The system of claim 14, wherein said at least one first, second and third application devices host network functions, with the network function hosted by the first application device managing profiles of said at least one second application device.

* * * * *